(12) United States Patent
Saito

(10) Patent No.: US 8,478,358 B2
(45) Date of Patent: Jul. 2, 2013

(54) IN-VEHICLE APPARATUS HAVING HANDSFREE FUNCTION AND CELLULAR PHONE HAVING HANDSFREE FUNCTION

(75) Inventor: Soichi Saito, Obu (JP)

(73) Assignee: Denso Corporation, Kariya (JP)

( * ) Notice: Subject to any disclaimer, the term of this patent is extended or adjusted under 35 U.S.C. 154(b) by 608 days.

(21) Appl. No.: 12/658,845

(22) Filed: Feb. 16, 2010

(65) Prior Publication Data

US 2010/0233998 A1  Sep. 16, 2010

(30) Foreign Application Priority Data

Feb. 18, 2009 (JP) ................................. 2009-035174

(51) Int. Cl.
*H04M 1/00* (2006.01)

(52) U.S. Cl.
USPC ............... 455/569.2; 455/412.2; 455/567; 709/206

(58) Field of Classification Search
USPC ................ 455/412.2, 567, 569.2; 709/206
See application file for complete search history.

(56) References Cited

U.S. PATENT DOCUMENTS

| 8,131,323 B2 * | 3/2012 | Miyake | 455/569.2 |
| 2010/0151833 A1 * | 6/2010 | Azuma et al. | 455/412.2 |

FOREIGN PATENT DOCUMENTS

| JP | 2002-223288 | 8/2002 |
| JP | 2002-291052 | 10/2002 |
| JP | 2009-027403 | 2/2009 |

OTHER PUBLICATIONS

U.S. Appl. No. 12/590,611, filed Nov. 11, 2009, Azuma et al.

* cited by examiner

*Primary Examiner* — Amancio Gonzalez
(74) *Attorney, Agent, or Firm* — Harness, Dickey & Pierce, PLC

(57) ABSTRACT

An in-vehicle apparatus having a handsfree function is disclosed, which includes an incoming mail reception determination section, a mode determination section and a control section. The incoming mail reception determination section determines whether a cellular phone receives an incoming mail. The mode determination section determines which one of a handset communication mode and a handsfree communication mode is selected in the cellular phone. The control section performs control regarding whether a mail reception notice should be issued to a user. The control section prohibits the mail reception notice from being issued to the user when the incoming mail reception determination section determines that the cellular phone receives the incoming mail and when the mode determination section determines that the cellular phone is in the handsfree communication mode.

6 Claims, 5 Drawing Sheets

IN-VEHICLE APPARATUS HAVING HANDSFREE FUNCTION AND CELLULAR PHONE HAVING HANDSFREE FUNCTION

CROSS REFERENCE TO RELATED APPLICATION

The present application is based on Japanese Patent Application No. 2009-35174 filed on Feb. 18, 2009, disclosure of which is incorporated herein by reference.

BACKGROUND OF THE INVENTION

1. Field of the Invention

The present invention relates to an in-vehicle apparatus that has a handsfree communication function and that is connectable with a cellular phone by simultaneously using handsfree communication protocol for handsfree communication and a mail forwarding protocol for mail forwarding. The present invention also relates to a cellular phone that is connectable with an in-vehicle apparatus having a handsfree communication function by simultaneously using a handsfree communication protocol and a mail forwarding protocol.

2. Description of Related Art

Applications of a cellular phone in a vehicle compartment include handsfree communications. When a cellular phone supporting a Bluetooth (registered trademark) (referred to hereinafter as BT) communication function is carried into a vehicle compartment of a vehicle equipped with an in-vehicle apparatus supporting a BT communication function, the connection is established between the cellular phone and the in-vehicle apparatus by using a handsfree profile (HFP) for handsfree communications defined in BT communications standards (see JP-2002-223288A for example).

In this relation, a message access profile (MAP) for mail forwarding defined in the BT communications standards is under consideration as being a profile for notifying an in-vehicle apparatus that an incoming mail is received by a cellular phone carried into a vehicle compartment, so that a user can be informed that the cellular phone receives the incoming mail.

By the way, when the cellular phone and the in-vehicle apparatus have therebetween the connection using the HFP, a user can perform communications in one of two modes: handset communications where a user uses a microphone and a speaker of the cellular phone to perform communications; and handsfree communications where a user uses a microphone and a speaker of the in-vehicle apparatus side to perform communications. It is likely that a user who is not driving (stopped or parked) may select the handset communications and a user who is driving may select the handsfree communications.

The applicant has studied a configuration for connecting the in-vehicle apparatus and the cellular phone by simultaneously using the HFP and the MAP, so that when a user is performing communications in one of the handset communication and the handsfree communication, a user can be informed from the in-vehicle apparatus that an incoming mail is received by the cellular phone. In relation to this, when a user is performing the handset communications, it is likely that the user is not driving, and thus, no trouble arises when a user is informed from the in-vehicle apparatus that an incoming mail is received by the cellular phone. In contrast, when a user is performing the handsfree communication, it is likely that the user is driving. In this case, if the reception of an incoming mail in the cellular phone is informed to the user from the in-vehicle apparatus, it may make the user, a user who is driving a vehicle, aware of the reception of an incoming mail, and may reduce driver distractions and may bring an undesirable situation.

SUMMARY OF THE INVENTION

In view of the above point, it is an objective of the present invention to provide an in-vehicle apparatus having a handsfree function and a cellular phone that can enhance usability by appropriately determining, depending on communicating modes of the cellular phone receiving an incoming mail, whether incoming mail reception should be notified to a user from the in-vehicle apparatus.

According to a first aspect of the present invention, an in-vehicle apparatus having a handsfree function is provided. The in-vehicle apparatus having the handsfree function includes a connection section, a mail reception determination section, a mode determination section and a control section. The connection section is connectable with a cellular phone by simultaneously using a handsfree communication protocol for handsfree communication and a mail forwarding protocol for mail forwarding. The cellular phone is operable in selectively one of a handset communication mode and a handsfree communication mode in a condition where the cellular phone is connected with the connection section by using the handsfree communication protocol. In the handset communication mode, a voice path between the cellular phone and the in-vehicle apparatus having the handsfree function is closed, and a voice inputted via a voice input part of the cellular phone is transmitted toward a communication counterpart as an outgoing voice, and a voice received from the communication counterpart is outputted from a voice output part of the cellular phone as an incoming voice. In the handsfree communication mode, the voice path between the cellular phone and the in-vehicle apparatus having the handsfree function is open, and a voice inputted via a voice input device of the in-vehicle apparatus having the handsfree function is transmitted toward the communication counterpart as the outgoing voice, and the voice received from the communication counterpart is outputted from a voice output device of the in-vehicle apparatus having the handsfree function as the incoming voice. The mail reception determination section determines whether an incoming mail is received by the cellular phone, which is connected with the connection section by using the mail forwarding protocol. The mode determination section determines which one of the handset communication mode and the handsfree communication mode is selected in the cellular phone, which is connected with the connection section by using the mail forwarding protocol. The control section controls a mail reception notice regarding a notice that the incoming mail is received. The control section issues the mail reception notice to a user when the mail reception determination section determines that the incoming mail is received by the cellular phone, which is connected with the connection section by using the mail forwarding protocol, and when the mode determination section determines that the handset communication mode is selected in the cellular phone, by which the incoming mail is received. The control section prohibits the mail reception notice from being issued to the user when the mail reception determination section determines that the incoming mail is received by the cellular phone, which is connected with the connection section by using the mail forwarding protocol, and when the mode determination section determines that the handsfree communication mode is selected in the cellular phone, by which the incoming mail is received.

According to a second aspect of the present invention, a cellular phone is provided. The cellular phone is connectable with an in-vehicle apparatus having a handsfree function by simultaneously using a handsfree communication protocol for handsfree communication and a mail forwarding protocol for mail forwarding. The cellular phone is operable in, when having a connection with the in-vehicle apparatus having the handsfree function by using the handsfree communication protocol, selectively one of a handset communication mode and a handsfree communication mode. In the handset communication mode, a voice path between the cellular phone and the in-vehicle apparatus having the handsfree function is closed, and a voice inputted via a voice input part of the cellular phone is transmitted toward a communication counterpart as an outgoing voice, and a voice received from the communication counterpart is outputted from a voice output part of the cellular phone as an incoming voice. In the handsfree communication mode, the voice path between the cellular phone and the in-vehicle apparatus having the handsfree function is open, and a voice inputted via a voice input device of the in-vehicle apparatus having the handsfree function is transmitted toward the communication counterpart as the outgoing voice, and the voice received from the communication counterpart is outputted from a voice output device of the in-vehicle apparatus having the handsfree function as the incoming voice. The cellular phone issues a notice, which notifies that the cellular phone receives an incoming mail, to the in-vehicle apparatus having the handsfree function when the incoming mail is received by the cellular phone in a condition where: the cellular phone is connected with the in-vehicle apparatus having the handsfree function by simultaneously using the handsfree protocol and the mail forwarding protocol; and the handset communication mode is set in the cellular phone. The cellular phone prohibits the notice, which notifies that the cellular phone receives the incoming mail, from being issued to the in-vehicle apparatus having the handsfree function when the incoming mail is received by the cellular phone in a condition where the handsfree communication mode is set in the cellular phone.

According to the above in-vehicle apparatus having the handsfree function and the cellular phone, when the cellular phone receiving the incoming mail is in the handset communication mode, the mail reception notice is issued to the user, thereby causing the user to recognize the reception of the incoming mail in real time. In contrast, when the cellular phone receiving the incoming mail is in the handsfree communication mode, the mail reception notice is prohibited from being issued to the user, thereby causing the driver to be unaware of the reception of the incoming mail, and prevent reduction of driver distractions. It is therefore possible enhance usability by appropriately determining, depending on communicating mode of the cellular phone receiving an incoming mail, whether incoming mail reception should be notified to a user.

BRIEF DESCRIPTION OF THE DRAWINGS

The above and other objects, features and advantages of the present invention will become more apparent from the following detailed description made with reference to the accompanying drawings. In the drawings.

Figure 1:
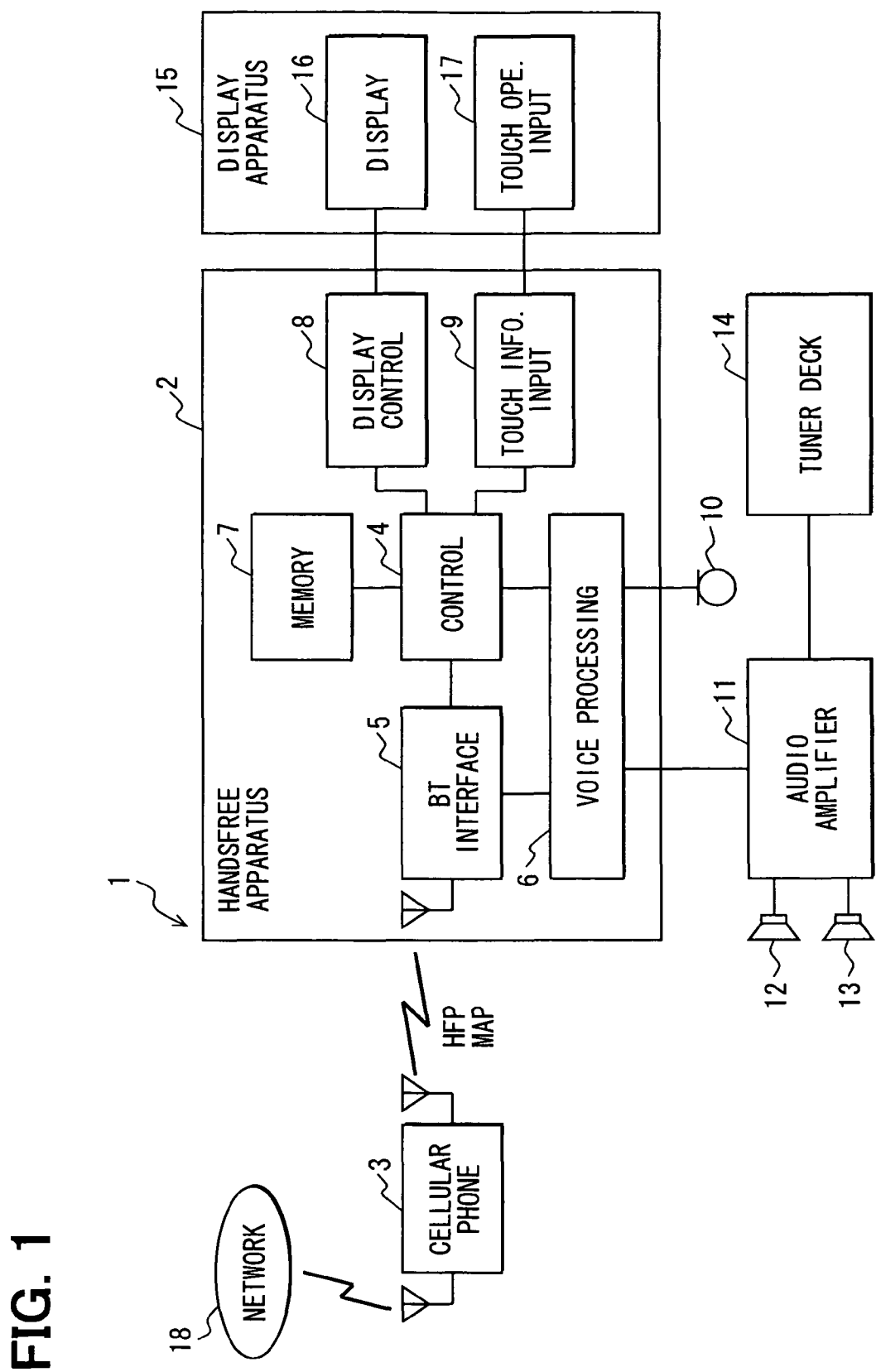
FIG. 1 is a functional block diagram illustrating an in-vehicle handsfree apparatus and a cellular phone in accordance with one embodiment.

DETAILED DESCRIPTION OF THE EXEMPLARY EMBODIMENTS (Embodiments)

One embodiment of the present invention will be illustrated below with reference to the drawings. In the followings, it is assumed that a cellular phone having a Bluetooth (registered trademark) (referred to hereinafter as BT) communication function to support BT is carried into a vehicle compartment of a vehicle equipped with an in-vehicle handsfree apparatus (which can act as an in-vehicle apparatus having a handsfree function) having a BT communication function to support BT. Further, it is assumed that the in-vehicle handsfree apparatus is communicatable with the cellular phone via a BT communication link.

An in-vehicle handsfree system 1 includes an in-vehicle handsfree apparatus 2 and a cellular phone 3. The in-vehicle handsfree apparatus 2 includes a controller 4, a BT interface (IF) unit 5 (which can act as a connection section or means), a communication voice processing unit 6, a memory unit 7, a display control unit 8 and a touch information input unit 9. The controller 4 can acts as a mail reception determination section or means, a mode determination section or means, a control section or means.

The controller 4 includes a CPU, a RAM, a ROM, an I/O bus and the like, which can form a known microcomputer. The controller 4 may control generally all of operations of the in-vehicle handsfree apparatus 2, including a communications operation, a data management operation and the like. The BT interface unit 5 has a function to perform BT communications with the cellular phone 3. The BT interface unit 5 supports a handsfree profile (HFP) for enabling handsfree communication and a message access profile (MAP) for enabling mail forwarding, which are defined in the BT communications standards. The BT interface unit 5 is configured to be connectable (called multi-connection) with the cellular phone 3 by simultaneously using these profiles. In the above, the mail is an inclusive term of text message, image information and the like that are exchangeable via a known computer network. In addition to the HFP and the MAP, the BT interface unit 5 further supports a phone book access profile (PBAP), an object push profile (OPP), and the like. The PBAP is used in transferring data such as phonebook data, outgoing call history data, incoming call history data and the like. The OPP is used in transferring a variety of data. These profiles mean communication protocols that are defined on a function basis. It should be noted the above handsfree profile (HFP) is an example of an handsfree communication protocol, and the above message access profile (MAP) is an example of a mail forwarding protocol.

The communication voice processing unit 6 is connected with a microphone 10. The microphone 10 is arranged in a vehicle compartment and is located at a place where efficient collection of user voice is possible. For example, the microphone 10 is located in the vicinity of a steering wheel. The communication voice processing unit 6 is connected with an audio amplifier 11. The audio amplifier 11 is external with respect to the in-vehicle handsfree apparatus 2 and is connected with two speakers 12, 13. The speakers 12 and 13 are arranged symmetric to each other with respect to an axis of symmetry that extends in a longitudinal direction of the vehicle. For example, the speakers 12 and 13 are respectively mounted to a driver side door and a front passenger side door. The audio amplifier 11 is connected with a tuner deck 14. When a music read from a storage medium for music, a radio program received from a radio station or the like is inputted to the audio amplifier 11 from the tuner deck 14, the audio amplifier 11 amplifies the inputted music or radio program and outputs it from the speakers 12 and 13. The microphone 10 is an example of a voice input device or means of an in-vehicle handsfree apparatus side. The speaker 12, 13 is an example of a voice output device or means of an in-vehicle handsfree apparatus.

The memory unit 7 is configured so that various data is storable therein. For example, the various data storable in the memory unit 7 includes phonebook data, outgoing call history data, incoming call history data and the like. The phonebook data indicates a relationship between phone numbers and registered names. The outgoing call history data indicates a time and a dialed phone number of an outgoing call from the in-vehicle handsfree apparatus 2 or the cellular phone 3 connected with the in-vehicle handsfree apparatus 2 using the HFP. The incoming call history data indicates a time and a caller's phone number of an incoming call received with the cellular phone 3 connected with the in-vehicle handsfree apparatus 2 using the HFP.

A display apparatus 15 includes a display unit 16 for displaying a variety of windows and a touch operation input unit 17 for providing a touch switch on the display unit 16. When a display instruction signal is inputted to the display control unit 8 from the controller 4, the display control unit 8 controls a display operation of the display unit 16 of the display apparatus 15 based on the display instruction signal. The touch information input unit 9 receives an operation detection signal from the touch operation input unit 17 in response to user operation on the touch switch on the window. The touch information input unit 9 outputs the operation detection signal to the controller 4, and the controller 4 analyzes the operation detection signal.

The cellular phone 3 includes: a control part for controlling generally all of operations of the cellular phone 3; a telecommunication part for performing telecommunications via a communication network 18; a BT interface part for performing BT communications; a key part in which various keys for user manipulation are arranged, a memory part for storing therein various data, e.g., phone book data indicative of a relationship between a phone number and a registered name; a display part for displaying various images; a microphone for receiving user voice; and a speaker for outputting a voice received from a communication counterpart as an incoming voice. In the above, the BT interface part of the cellular phone 3 has a function to perform BT communication with the in-vehicle handsfree apparatus 2. Further, the BT interface part of the cellular phone 3 supports the HFP and the MAP, and can have a connection with the in-vehicle handsfree apparatus 1 by simultaneously using the HFP and the MAP in a manner similar to that in the BT interface unit 5 of the in-vehicle handsfree apparatus 2. In the above, the microphone of the cellular phone 3 is an example of voice input part or means of a cellular phone, and the speaker of the cellular phone 3 is an example of voice output part or means of a cellular phone.

Now, explanation is given on a case where the cellular phone 3 receives an incoming call via the communication network 18 when the cellular phone 3 and the in-vehicle handsfree apparatus 2 are connected with each other using the HFP. The communication network 18 recited herein includes an apparatus for providing cellular phone communication service, such as a cellular phone base station, a base station control apparatus and the like.

When the cellular phone 3 detects receiving an incoming call via the communication network while having the connection with the in-vehicle handsfree apparatus 2 using the HFP, the cellular phone 3 transmits an incoming call reception notification, which indicates the cellular phone 3 receives incoming call, to the in-vehicle handsfree apparatus 2. In this case, to the in-vehicle handsfree apparatus 2, the cellular phone 3 transmits the incoming call reception notification including identification information (e.g., a registered phone number of the cellular phone 3) for identification of the cellular phone 3 receiving the incoming call. Moreover, if a phone number of a caller is received via the communication network, the cellular phone 3 transmits the incoming call reception notification including the phone number of the caller to the in-vehicle handsfree apparatus 2. Furthermore, if the cellular phone 3 supports in-band ringtone, the cellular phone 3 transmits a ringtone registered therein to the in-vehicle handsfree apparatus 2.

When the controller 4 of the in-vehicle handsfree apparatus 2 receives the incoming call reception notification from the cellular phone 3 via the BT interface unit 5, and when the controller 4 does not receive the ringtone from the cellular phone 3, the controller 4 causes the speakers 12, 13 to output a ringtone registered in the in-vehicle handsfree apparatus 2, thereby notifying a user that the cellular phone 3 is receiving the incoming call. If the controller 4 receives the ringtone from the cellular phone 3 via the BT interface unit 5, the controller 4 causes the speakers 12, 13 to output the received ringtone (which is substantially identical to that registered in the cellular phone 3). In addition, the controller 4 causes the display unit 16 to display an incoming call receiving notice window 19 illustrated in FIG. 2 to indicate that the cellular phone 3 is receiving the incoming call.

Through the above-described operation, a user can recognize that the cellular phone 3 is receiving the incoming call, by hearing the ringtone outputted from the speakers 12, 13 or viewing the incoming call receiving notice window displayed on the display unit 16. When recognizing that the cellular phone 3 is receiving the incoming call, the user can select, by operating the cellular phone 3, whether to answer or reject the incoming call of the cellular phone 3 in private communication. In addition, the user can select, by operating the in-vehicle handsfree apparatus 2, whether to answer or reject the incoming call of the cellular phone 3 in handsfree communication. In the above, the private communication is a communication mode in which: the microphone and the speaker of the cellular phone 3 are used to perform communications; a voice path between the cellular phone 3 and the in-vehicle handsfree apparatus 2 is closed; and voice is not transceivable between the cellular phone 3 and the in-vehicle handsfree apparatus 2. The handsfree communication is another communication mode in which: the microphone 10 and the speakers 12, 13 connected with the in-vehicle handsfree apparatus 2 are used to perform communications; the voice path between the cellular phone 3 and the in-vehicle handsfree apparatus 2 is open; and the voice is transceivable between the cellular phone 3 and the in-vehicle handsfree apparatus 2. In connection with the above, it is likely that a user who is not driving (stopped or parked) may select the handset communication and a user who is driving may select the handsfree communication. The above private communication may be also referred to as handset communication.

Figure 2:
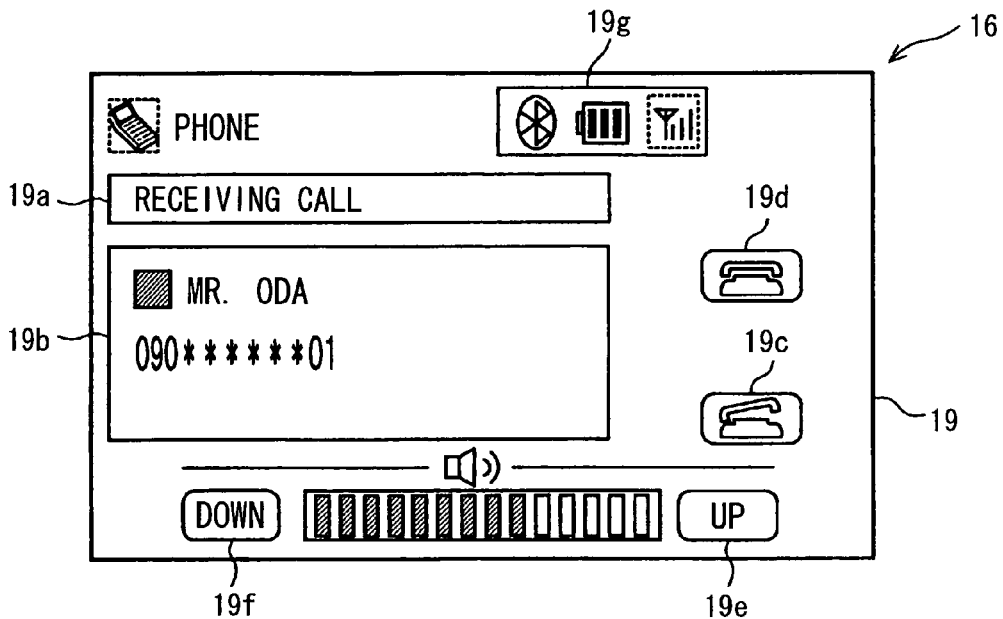
FIG. 2 is a diagram illustrating an incoming call receiving notice window.

FIG. 2 illustrates a case where an incoming call is received by the cellular phone 3 via the communication network 18, and a caller's phone number "090****01" is received from the cellular phone 3, and a name "MR. Oda" is stored in the phone book date as being a registered name corresponding to the caller's phone number received from the cellular phone 3. The controller 4 displays "receiving a incoming call" on a state notice region 19a of the incoming call receiving notice window 19 to indicate that the cellular phone 3 is receiving an incoming call. Moreover, the controller 4 displays caller information such as "090***01" and "Mr. Oda" on a caller information display region 19b of the incoming call receiving notice window 19.

In addition, the controller 4 forms and displays an answer switch 19c, a rejection switch 19d, a volume up switch 19e and a volume down switch 19f. The answer switch 19c is operable for a user to answer an incoming call. The rejection switch 19d is operable for a user to reject an incoming call. The volume up switch 19e is operable for a user to increase the sound volume of the ringtone outputted from the speakers 12, 13. The volume down switch 19f is operable for a user to decrease the sound volume of the ringtone outputted from the speakers 12, 13. Furthermore, on a cellular phone condition display region 19g, the controller 4 displays a remaining battery level icon indicative of a remaining battery level of the cellular phone 3 and a reception quality icon indicative of reception quality of the cellular phone 3 by receiving information on the remaining battery level and the reception quality of the cellular phone 3 from the cellular phone 3.

When the cellular phone 3 is in an incoming call receiving mode, a user can operate the answer key of the cellular phone to answer the incoming call of the cellular phone 3 in the private communication. In addition, the user can operate the rejection key of the cellular phone 3 to reject the incoming call of the cellular phone 3. In addition, the user can operate the answer switch 19c on the incoming call receiving notice window 19 to answer the incoming call of the cellular phone 3 in the handsfree communication. In addition, the user can operate the rejection switch 19d on the incoming call receiving notice window 19 to reject the incoming call of the cellular phone 3.

Figure 3:
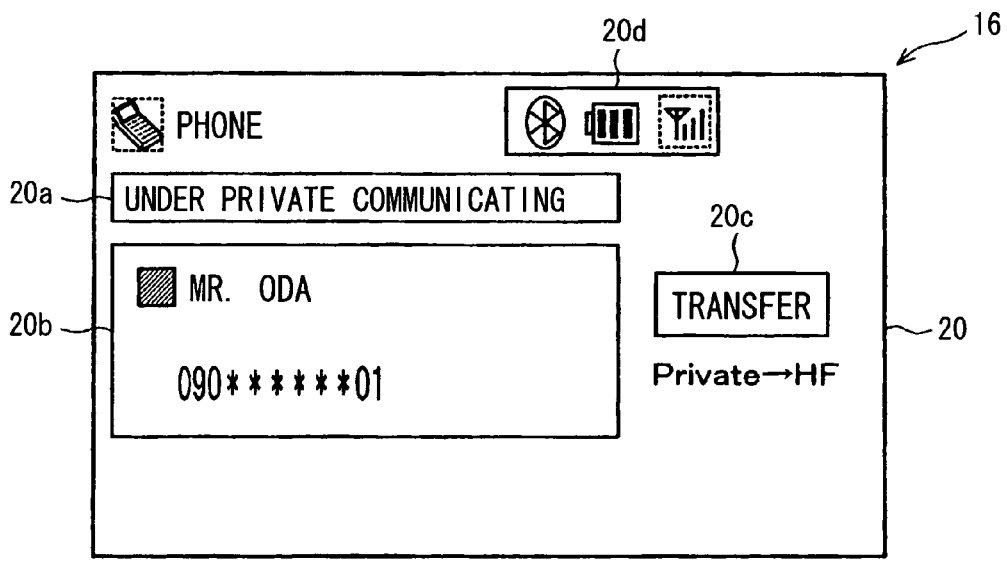
FIG. 3 is a diagram illustrating a private communicating notice window.

FIG. 3 illustrates a case where a user operates the answer key of the cellular phone 3 to answer an incoming call of the cellular phone 3 in the private communication. When the controller 4 determines that the answer key of the cellular phone is operated by a user, the controller 4 causes the cellular phone 3 to perform an operation of answering the incoming call while not opening the voice path between the BT interface unit 5 and the cellular phone 3. Further, after the cellular phone 3 is switched from the incoming call receiving mode to a private communication mode, the controller 4 switches display from the incoming call receiving notice window 19 illustrated in FIG. 2 to a private communicating notice window 20 illustrated in FIG. 3.

The controller 4 displays "under private communicating" on a state display region 20a of the private communicating notice window 20 to indicate that the private communication is being performed. Further, the controller 4 displays caller information such as "090*****01" and "Mr. Oda" on a caller information display region 20b of the private communicating notice window 20. In addition, the controller 4 displays a transfer switch 20c, which is operable for a user to switch mode from the private communication mode to the handsfree communication mode. In addition, the controller 4 displays a remaining battery level icon indicative of the remaining battery level of the cellular phone 3 and a reception quality icon indicative of the reception quality of the cellular phone 3 on a phone condition display region 20d, by receiving information on the remaining battery level and the reception quality of the cellular phone 3 from the cellular phone 3.

Figure 4:
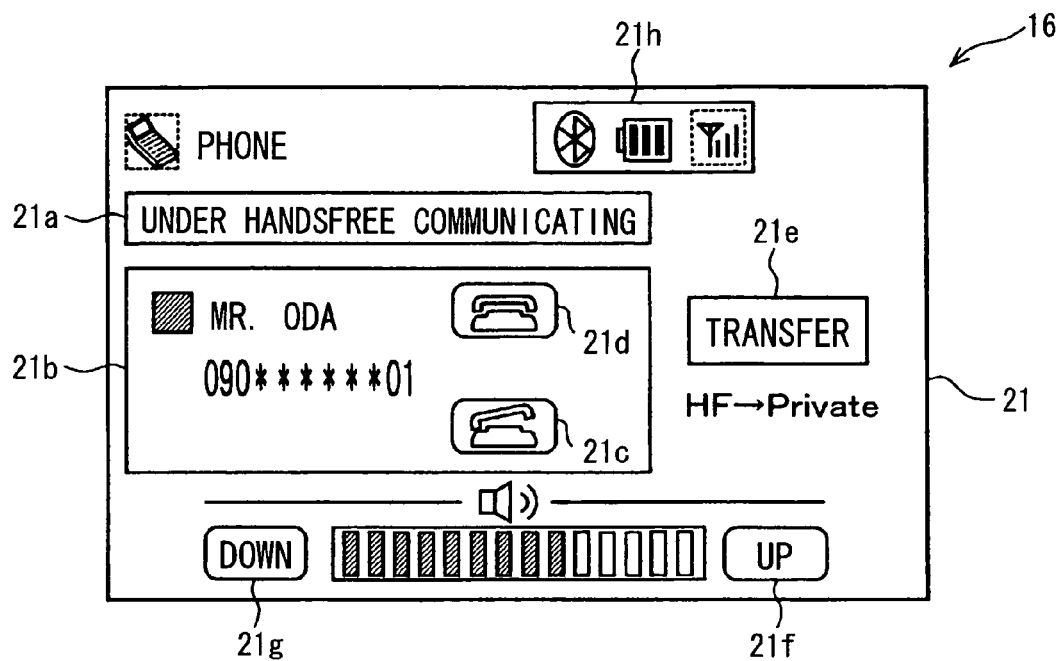
FIG. 4 is a diagram illustrating a handsfree communicating notice window.

FIG. 4 illustrates a case where a user operates the answer switch 19c on the incoming call receiving notice window 19 to answer the incoming call of the cellular phone 3 in the handsfree communication. When the controller 4 determines that the answer switch 19c on the call receiving notice window 19 is operated by a user, the controller 4 causes the cellular phone 3 to perform an operation of answering the incoming call. In addition, the controller 4 opens the voice path between the BT interface unit 5 and the cellular phone 3. Moreover, after the cellular phone 3 is switched from the incoming call receiving mode to the handsfree communication mode, the controller 4 switches the display from the incoming call receiving notice window 19 illustrated in FIG. 2 to a handsfree communicating notice window 21 illustrated in FIG. 4 to indicate that the handsfree communication is being performed.

The controller 4 displays "under handsfree communicating" on a state display region 21a of the handsfree communicating notice window 21 and displays caller information such as the caller including "090*****01" and "Mr. ODA" on a caller information display region 21b of the handsfree communicating notice window 21. In addition, the controller 4 forms and displays a hold switch 21c, a hang up switch 21d, a transfer switch 21e, a volume up switch 21f and a volume down switch 21g. The hold switch 21c is operable for a user to hold the handsfree communication. The hang up switch 21d is operable for a user to hang up the handsfree communication. The transfer switch 21e is operable for a user to switch (transfer) mode from the handsfree communication mode to the private communication mode. The volume up switch 21f is operable for a user to increase the volume of the incoming voice outputted from the speakers 12 and 13. The volume down switch 21g is operable for a user to decrease the volume of the incoming voice outputted from the speakers 12 and 13. Moreover, on a phone condition display region 21h, the controller 4 displays a remaining battery level icon indicative of a remaining battery level of the cellular phone 3 and a reception quality icon indicative of the reception quality of the cellular phone 3 by receiving information on the remaining battery level and the reception quality of the cellular phone 3 from the cellular phone 3.

Figure 5:
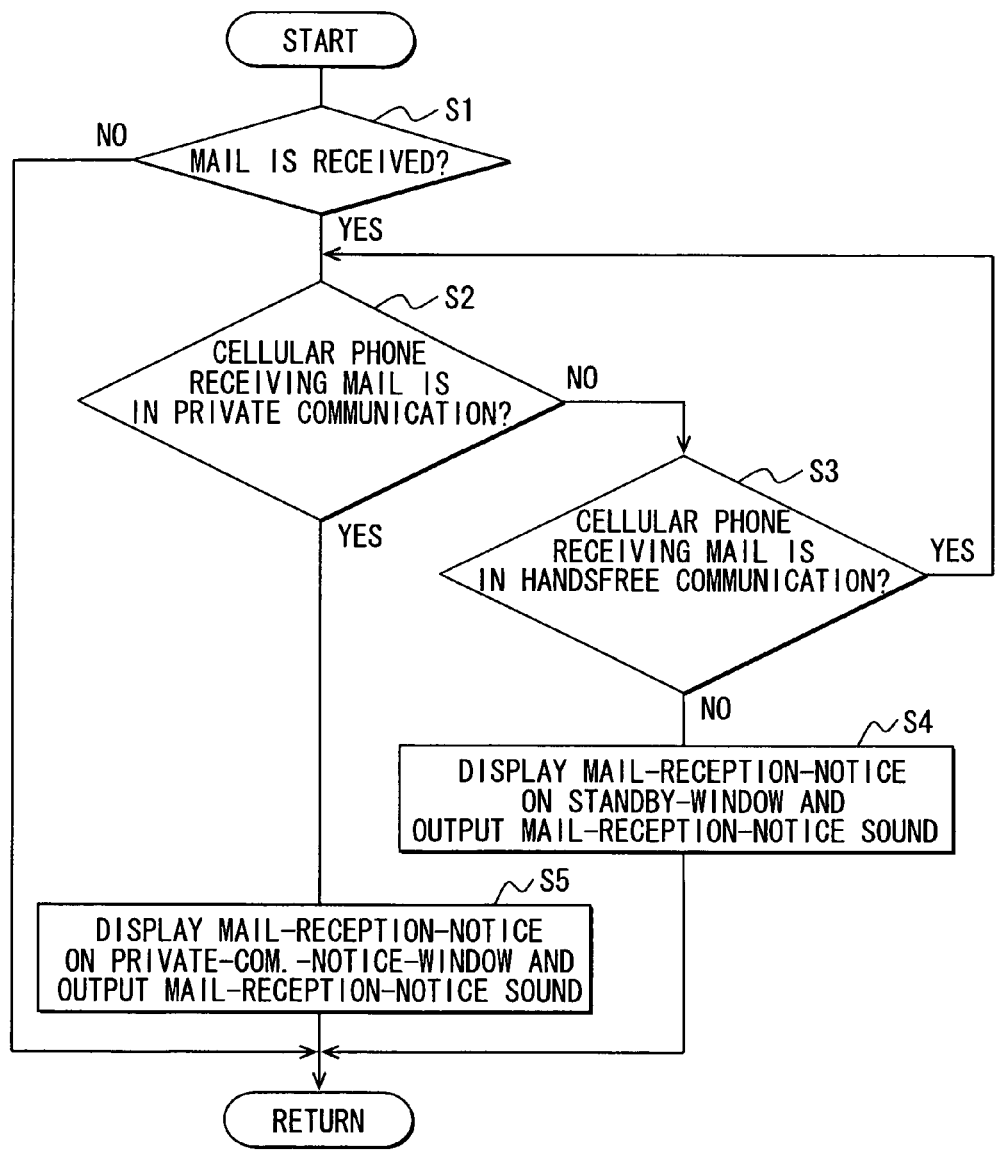
FIG. 5 is a flowchart illustrating a incoming mail detection process.
Figure 6:
FIG. 6 is a diagram illustrating a mail reception notice window displayed on a standby window.
Figure 7:
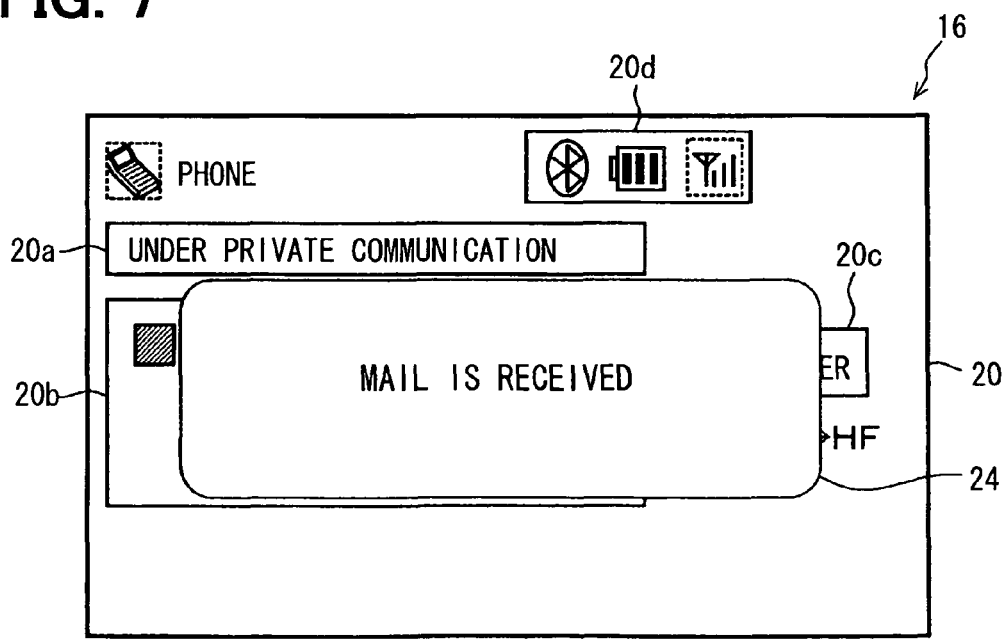
FIG. 7 is a diagram illustrating a mail reception notice window displayed on a private communicating notice window.

Operation associated with the above configuration will be illustrated below with reference to FIGS. 5 to 7. FIG. 5 is a flowchart illustrating an incoming mail detection process to be performed by the in-vehicle handsfree apparatus 2. When the controller 4 of the in-vehicle handsfree apparatus 2 starts performing the incoming mail detection process including a determination of whether an incoming mail is received by the cellular phone 3 via the communication network 18, the controller 4 determines at S1 whether an incoming mail is received by the cellular phone 3 via the communication network 18. When the controller 4 determines that an incoming call is not received by the cellular phone 3 via the communication network 18, the determination "NO" is made at S1, and the incoming mail detection process is ended, and the process returns to another process (e.g., a main process).

When the controller 4 determines, based on the mail reception notification inputted from the cellular phone 3, that an incoming call is received by the cellular phone 3 via the communication network 18, the determination "YES" is made at S1 and the process proceeds to S2. At S2, based on a state notification inputted from the cellular phone 3, the controller 4 determines whether the cellular phone 3 having received an incoming mail is in the private communication mode. When the cellular phone 3 having received an incoming mail is in the private communication mode, the determination "YES" is made at S2 and the process proceeds to S5. When the cellular phone 3 having received an incoming mail is not in the private communication mode, the determination "NO" is made at S2 and the process proceeds to S3. At S3, based on the state notification from the cellular phone 3, the controller 4 determines whether the cellular phone 3 having received an incoming mail is in a handsfree communication mode or a standby mode (i.e., a mode where the cellular phone 3 waits to receive an incoming call).

When the controller 4 determines, based on the state notification from the cellular phone 3, that the cellular phone 3 is in neither the private communication mode nor the handsfree communication mode but in the standby mode, the determination "NO" is made at both of at S2, S3, and the process proceeds to S4. At S4, the controller 4 pops up an mail reception notice window on the standby window to indicate that the incoming mail is received, and at the same time, the controller 4 causes the speakers 12, 13 to output a mail reception notice sound, which indicates that the incoming mail is received.

For example, the cellular phone 3 may receive an incoming mail when the display unit 16 is displaying, as the standby window, a route guidance window for route guidance (a window in which the present location of the vehicle is superimposed on the map). In this case, as shown in FIG. 6, the controller 4 pops up the mail reception notice window 23 on the route guidance window 22 that is set to the standby window. According to the above manners, a user can visually recognize the reception of an incoming mail in real time by viewing the mail reception notice window 23 popped up on the route guidance window 22. Moreover, a user can auditorily recognize the reception of an incoming mail in real time by hearing the mail reception notice sound outputted from the speakers 12, 13.

When the controller 4 determines, based on the state notification from the cellular phone 3, that the cellular phone 3 having received an incoming mail is in the private communication mode, the determination "NO" is made at S2, and the process proceeds to S5. At S5, the processing unit pops up the mail reception notice window, which indicates that the incoming mail is received, on the private communicating notice window, and at the same time, the processing unit causes the speaker 12, 13 to output the mail reception notice sound indicating that the incoming mail is received.

For example, the cellular phone 3 may receive an incoming mail when the display unit 16 is displaying the private communicating notice window 20 illustrated in FIG. 3. In this case, as shown in FIG. 7, the controller 4 pops up the mail reception notice window 24 on the private communicating notice window 20. According to the above manners, a user can visually recognize the mail reception in real time by viewing the mail reception notice window 24 popped up on the private communicating notice window 20. Moreover, a user can auditorily recognize the mail reception in real time by hearing the mail reception notice sound outputted from the speakers 12, 13.

In connection with the above, the controller 4 sets the volume of the mail reception notice sound so that the volume of the mail reception notice sound to be outputted in a case of the private communicating mode of the cellular phone 3 is set smaller than that to be outputted in a case of the standby mode of the cellular phone 3. More specifically, when a user manually sets the volume of the mail reception notice sound to be outputted in a case of the standby mode for example, the controller 4 automatically sets the volume of the mail reception notice sound to be outputted in a case of the private communicating mode so that the volume of the mail reception notice sound to be outputted in a case of the private communicating mode is smaller than that in a case of the standby mode. In contrast to the above, when a user manually sets the volume of the mail reception notice sound to be outputted in a case of the private communicating mode for example, the controller 4 automatically sets the volume of the mail reception notice sound to be outputted in a case of the standby mode so that the volume of the mail reception notice sound to be outputted in a case of the standby mode is larger than in a case of the private communicating mode.

When the controller 4 determines, based on the state notification from the cellular phone 3, that the cellular phone 3 having received an incoming mail is in the handsfree communicating mode, the determination "YES" is made at S3. In this case, the controller 4 returns the process to S2, S3 while prohibiting the mail reception notice window indicative of the mail reception from being displayed and prohibiting the mail reception notice sound from being outputted from the speakers 12, 13, and the controller 4 determines again whether the cellular phone 3 having received an incoming mail is in the private communicating mode, the handsfree communicating mode or the standby mode.

Then, when the controller 4 determines that the cellular phone 3 having received an incoming mail is switched from the private communicating mode to the standby mode (corresponding to "NO" at S2 and "NO" at S3), the controller 4 pops up the mail reception notice window 23 indicative of the mail reception on the standby window 22, and at the same time, the controller 4 causes the speakers 12, 13 to output the mail reception notice sound indicative of the mail reception (corresponding to S4) in the above-described way. When the controller 4 determines that the cellular phone 3 having received an incoming mail is switched from the handsfree communicating state to the private communicating state (corresponding to "YES" at S2), the controller 4 pops up the mail reception notice window 24 indicative of the mail reception on the private communicating notice window 20, and at the same time, the controller 4 causes the speakers 12, 13 to output the mail reception notice sound indicative of the mail reception (corresponding to S5) in the above-described way.

According to the present embodiment, as described above, the in-vehicle handsfree apparatus 2 is configured such that: when the cellular phone having received an incoming mail is in the private communicating state in a condition where the in-vehicle handsfree apparatus 2 has the connection with the cellular phone 3 by using the HFP and the MAP, the in-vehicle handsfree apparatus 2 causes the display unit 16 to display the mail reception notice window 24 and causes the speakers 12, 13 to output the mail reception notice sound thereby to notify a user that the incoming mail is received, so that the in-vehicle handsfree apparatus 2 enables a user to recognize the reception of the incoming mail in real time. In contract, when the cellular phone 3 having received an incoming mail is in the handsfree communication mode, the in-vehicle handsfree apparatus 2 prohibits a notice of reception of the incoming mail from being issued to a user while prohibiting the display unit 16 from displaying the mail reception notice window 24 and while prohibiting the speakers 12, 13 from outputting the mail reception notice sound, so that the in-vehicle handsfree apparatus 2 can avoid causing a user to be aware of the reception of an incoming mail.

That is, the reception of an incoming mail is notified to a user in a case of the private communication mode where it is likely that a user is not driving. In contrast, the reception of an incoming mail is prohibited from being notified to a user in a case of the handsfree communication mode where it is likely that a user is driving. It is accordingly possible to enhance usability by appropriately determining whether the reception of an incoming mail should be notified to a user depending on communication mode of the cellular phone having received an incoming mail.

Moreover, since the in-vehicle handsfree apparatus 2 is configured to cause the display unit 16 to display the mail reception notice window 24, 23 and cause the speakers 12, 13 to output the mail reception notice sound in response to the switching of the cellular phone having received an incoming mail from the handsfree communication mode to the private communication mode or to the standby mode. Therefore, the in-vehicle handsfree apparatus 2 can cause a user to recognize the reception of an incoming mail in response to a user operation for switching from the handsfree communication to the private communication or in response to a user operation for ending the handsfree communication.

Furthermore, since the volume of the mail reception notice sound to be outputted in a case of the private communication mode of the cellular phone 3 is set smaller than that in a case of the standby state of the cellular phone, the large volume of the mail reception notice sound reliably enables a user to recognize the reception of an incoming mail when the cellular phone is in the standby mode. In contrast, when the cellular phone is in the private communication mode, the small volume of the mail reception notice sound can make a suppressed influence on the incoming voice in the private communication while enabling a user to recognize the reception of an incoming mail. Therefore, it is possible to avoid such a situation where the incoming voice in the private communication is hard to hear due to the mail reception notice sound.

The above embodiments can be modified or extended in various ways.

The in-vehicle handsfree apparatus may be built in another in-vehicle apparatus such as an in-vehicle navigation apparatus and the like.

In the above embodiment, the in-vehicle handsfree apparatus causes the display unit to form and display touch sensitive switches, which include: a communication transfer switch which is operable to switch from the private communication to the handsfree communication; a communication transfer switch which is operable to switch the handsfree communication to the private communication; an answer switch which is operable to answer an incoming call; and a rejection switch which is operable to reject an incoming call. However, these switches are not limited to touch sensitive switches and may include, for example, mechanical switches arranged in the vicinity of a steering wheel or arranged between a driver seat and a front passenger sheet. In this case, a procedure for operating these switches may be display by a display unit.

A layout of display regions and switches on each notice window may be modified into another layout.

In the above embodiment, after a cellular phone transmits a mail reception notification to an in-vehicle apparatus having a handsfree function, the in-vehicle apparatus having a handsfree function determines communication mode of the cellular phone and makes a selection regarding a notice of the reception of an incoming mail. However, configuration is not limited to the above. For example, the cellular phone may determine communication mode thereof and determine whether to transmit the mail reception notification. More specifically, when the cellular phone receives an incoming mail while being in the private communication mode, the cellular phone may transmit the mail reception notification to the in-vehicle apparatus having a handsfree function, thereby causing the in-vehicle apparatus having a handsfree function to issue a mail reception notice. When the cellular phone receives an incoming mail while being in the handsfree communication mode, the cellular phone 3 does not transmits the mail reception notification to the in-vehicle apparatus having a handsfree function, thereby preventing the in-vehicle apparatus having a handsfree function from issuing a mail reception notice. In this configuration also, when the cellular phone having received an incoming mail is in the private communication mode, the mail reception notice is issued to a user, thereby causing a user to recognize the reception of an incoming mail in real time. When the cellular phone having received an incoming mail is in the handsfree communication mode, the mail reception notice is prohibited from being issued to a user, thereby avoiding such as a situation where a user becomes aware of the reception of an incoming mail.

In the above embodiments and modifications, the in-vehicle handsfree apparatus 2 is an example of an in-vehicle apparatus having a handsfree function. The controller 4 is an example of a mail reception determination section or means, an example of a mode determination section or means, and an example of a control section or control means. The BT interface unit 5 is an example of a connection section or means. The microphone 10 is an example of a voice input means or device of an in-vehicle apparatus side. The speaker 12, 13 is an example of a voice output means or device of an in-vehicle apparatus side.

According to a first aspect of the present disclosure, an in-vehicle apparatus having a handsfree function is provided. The in-vehicle apparatus having the handsfree function includes a connection section, a mail reception determination section, a mode determination section and a control section. The connection section is connectable with a cellular phone by simultaneously using a handsfree communication protocol for handsfree communication and a mail forwarding protocol for mail forwarding. The cellular phone is operable in selectively one of a handset communication mode and a handsfree communication mode in a condition where the cellular phone is connected with the connection section by using the handsfree communication protocol. In the handset communication mode, a voice path between the cellular phone and the in-vehicle apparatus having the handsfree function is closed, and a voice inputted via voice input means of the cellular phone is transmitted toward a communication counterpart as an outgoing voice, and a voice received from the communication counterpart is outputted from voice output means of the cellular phone as an incoming voice. In the handsfree communication mode, the voice path between the cellular phone and the in-vehicle apparatus having the handsfree function is open, and a voice inputted via voice input means of the in-vehicle apparatus having the handsfree function is transmitted toward the communication counterpart as the outgoing voice, and the voice received from the communication counterpart is outputted from voice output means of the in-vehicle apparatus having the handsfree function as the incoming voice. The mail reception determination section determines whether an incoming mail is received by the cellular phone connected with the connection section by using the mail forwarding protocol. The mode determination section determines which one of the handset communication mode and the handsfree communication mode is selected in the cellular phone connected with the connection section by using the mail forwarding protocol. The control section controls a mail reception notice regarding a notice that the incoming mail is received. The control section issues the mail reception notice to a user when the mail reception determination section determines that the incoming mail is received by the cellular phone connected with the connection section by using the mail forwarding protocol, and when the mode determination section determines that the handset communication mode is selected in the cellular phone, by which the incoming mail is received. The control section prohibits the mail reception notice from being issued to the user when the mail reception determination section determines that the incoming mail is received by the cellular phone connected with the connection section by using the mail forwarding protocol, and when the mode determination section determines that the handsfree communication mode is selected in the cellular phone, by which the incoming mail is received.

According to the above in-vehicle apparatus having the handsfree function, when the cellular phone having received the incoming mail is in the handset communication mode, the mail reception notice is issued to the user, thereby causing the user to recognize the reception of the incoming mail in real time. In contrast, when the cellular phone having received the incoming mail is in the handsfree communication mode, the mail reception notice is prohibited from being issued to the user, thereby causing the driver to be unaware of the reception of the incoming mail, and preventing reduction of driver distractions. It is therefore possible to enhance usability by appropriately determining, depending on communication mode of the cellular phone having received an incoming mail, whether the reception of an incoming mail should be notified to a user.

The above in-vehicle apparatus having the handsfree function may be configured such that the control section issues the mail reception notice to the user when the mode determination section determines that the cellular phone is switched from the handsfree communication mode to the handset communication mode, after: the mail reception determination section determined that the incoming mail was received by the cellular phone connected with the connection section by using the mail forwarding protocol; and the mode determination section determined that the handsfree communication mode was selected in the cellular phone, by which the incoming mail was received.

According to the above in-vehicle apparatus having the handsfree function, it is possible to enable the user to recognize the reception of the incoming mail after the cellular phone is switched from the handsfree communication mode to the handset communication mode due to a user operation of switching the handsfree communication to the handset communication.

The above in-vehicle apparatus having the handsfree function may be configured such that: the cellular phone is operable further in a standby mode where the cellular phone waits to receive an incoming call; the mode determination section determines which one of the handset communication mode, the handsfree communication mode and the standby mode is selected in the cellular phone connected with the connection section by using the mail forwarding protocol; and the control section issues the mail reception notice to the user when the mode determination section determines that the cellular phone is switched from the handsfree communication mode to the standby mode, after: the mail reception determination section determined that the incoming mail was received by the cellular phone connected with the connection section by using the mail forwarding protocol; and the mode determination section determined that the handsfree communication mode was selected in the cellular phone, by which the incoming mail was received.

According to the above in-vehicle apparatus having the handsfree function, it is possible to enable the user to recognize the reception of the incoming mail after the cellular phone is switched from the handsfree communication mode to the standby mode due to a user operation of ending the handsfree communication.

The above in-vehicle apparatus having the handsfree function may be configured such that: when the cellular phone, by which the incoming mail is received, is in the handset communication mode, volume of a mail reception notice sound outputted from the voice output means of the in-vehicle apparatus having the handsfree function is a first volume; when the cellular phone, by which the incoming mail is received, is in the standby mode, the volume of the mail reception notice sound outputted from the voice output means of the in-vehicle apparatus having the handsfree function is a second volume; and the control section sets the first volume so that the first volume is smaller than the second volume.

According to the above in-vehicle apparatus having the handsfree function, since the mail reception notice sound has a large volume when the cellular phone is in the standby mode, the in-vehicle apparatus reliably enables a user to recognize the reception of the incoming mail. In contrast, the mail reception notice sound has a small volume when the cellular phone is in the handset communication mode, the in-vehicle apparatus enables a user to recognize the reception of the incoming mail while suppressing an influence on the incoming voice in the handset communication and avoiding such a situation where the incoming voice is hard to hear due to the mail reception notice sound.

According to a second aspect of the present disclosure, a cellular phone is provided. The cellular phone is connectable with an in-vehicle apparatus having a handsfree function by simultaneously using a handsfree communication protocol for handsfree communication and a mail forwarding protocol for mail forwarding. The cellular phone is operable in, when having a connection with the in-vehicle apparatus having the handsfree function by using the handsfree communication protocol, selectively one of a handset communication mode and a handsfree communication mode. In the handset communication mode, a voice path between the cellular phone and the in-vehicle apparatus having the handsfree function is closed, and a voice inputted via voice input means of the cellular phone is transmitted toward a communication counterpart as an outgoing voice, and a voice received from the communication counterpart is outputted from voice output means of the cellular phone as an incoming voice. In the handsfree communication mode, the voice path between the cellular phone and the in-vehicle apparatus having the handsfree function is open, and a voice inputted via voice input means of the in-vehicle apparatus having the handsfree function is transmitted toward the communication counterpart as the outgoing voice, and the voice received from the communication counterpart is outputted from voice output means of the in-vehicle apparatus having the handsfree function as the incoming voice. The cellular phone issues a notification, which notifies that the cellular phone receives an incoming mail, to the in-vehicle apparatus having the handsfree function when the incoming mail is received by the cellular phone in a condition where: the cellular phone is connected with the in-vehicle apparatus having the handsfree function by simultaneously using the handsfree protocol and the mail forwarding protocol; and the handset communication mode is set in the cellular phone. The cellular phone prohibits the notification, which notifies that the cellular phone receives the incoming mail, from being issued to the in-vehicle apparatus having the handsfree function when the incoming mail is received by the cellular phone in a condition where the handsfree communication mode is set in the cellular phone.

According to a third aspect of the present disclosure, a method of controlling a cellular phone is provided. The method includes: causing the cellular phone to have a connection with an in-vehicle apparatus having a handsfree function by simultaneously using a handsfree communication protocol for handsfree communication and a mail forwarding protocol for mail forwarding, by utilizing an interface part of the cellular phone; causing the cellular phone, when the cellular phone has the connection with the in-vehicle apparatus having the handsfree function by using the handsfree communication protocol, to be operable in selectively one of a handset-communication mode and a handsfree communication mode; causing the cellular phone to issue a notification, which notifies that the cellular phone receives an incoming mail, to the in-vehicle apparatus having the handsfree function, when the cellular phone receives the incoming mail in a condition where the cellular phone is connected with the in-vehicle apparatus having the handsfree function by simultaneously using the handsfree protocol and the mail forwarding protocol and the cellular phone is in the handset communication mode; and prohibiting the cellular phone from issuing the notification, which notifies that the cellular phone receives the incoming mail, to the in-vehicle apparatus having the handsfree function, when the cellular phone receives the incoming mail in a condition where the cellular phone is connected with the in-vehicle apparatus having the handsfree function by simultaneously using the handsfree protocol and the mail forwarding protocol and the cellular phone is in the handsfree communication mode. In the handset communication mode, where a voice path between the cellular phone and the in-vehicle apparatus having the handsfree function is closed, and a voice inputted via voice input means of the cellular phone is transmitted toward a communication counterpart as an outgoing voice, and a voice received from the communication counterpart is outputted from voice output means of the cellular phone as an incoming voice. In the handsfree communication mode, the voice path between the cellular phone and the in-vehicle apparatus having the handsfree function is open, and a voice inputted via voice input means of the in-vehicle apparatus having the handsfree function is transmitted toward the communication counterpart as the outgoing voice, and the voice received from the communication counterpart is outputted from voice output means of the in-vehicle apparatus having the handsfree function as the incoming voice.

According to a fourth aspect of the present disclosure, a cellular phone is provided. The cellular phone includes an interface part, a voice output part, a voice input part and a control part. The interface part is connectable with an in-vehicle apparatus having a handsfree function by simultaneously using a handsfree communication protocol for handsfree communication and a mail forwarding protocol for mail forwarding. When the interface part has a connection with the in-vehicle apparatus having the handsfree function by using the handsfree communication protocol, the control part causes the cellular phone to be operable in, selectively one of a handset communication mode and a handsfree communication mode. In the handset communication mode, a voice path between the cellular phone and the in-vehicle apparatus having the handsfree function is closed, and a voice inputted via voice input means of the cellular phone is transmitted toward a communication counterpart as an outgoing voice, and a voice received from the communication counterpart is outputted from voice output means of the cellular phone as an incoming voice. In the handsfree communication mode, the voice path between the cellular phone and the in-vehicle apparatus having the handsfree function is open, and a voice inputted via voice input means of the in-vehicle apparatus having the handsfree function is transmitted toward the communication counterpart as the outgoing voice, and the voice received from the communication counterpart is outputted from voice output means of the in-vehicle apparatus having the handsfree function as the incoming voice. The control part issues a notification, which notifies that the cellular phone receives an incoming mail, to the in-vehicle apparatus having the handsfree function when the incoming mail is received by the cellular phone in a condition where: the cellular phone is connected with the in-vehicle apparatus having the handsfree function by simultaneously using the handsfree protocol and the mail forwarding protocol; and the handset communication mode is set in the cellular phone. The control part prohibits the notification, which notifies that the cellular phone receives the incoming mail, from being issued to the in-vehicle apparatus having the handsfree function when the incoming mail is received by the cellular phone in a condition where the handsfree communication mode is set in the cellular phone.

While the invention has been described above with reference to various embodiments thereof, it is to be understood that the invention is not limited to the above described embodiments and constructions. The invention is intended to cover various modifications and equivalent arrangements. In addition, while the various combinations and configurations described above are contemplated as embodying the invention, other combinations and configurations, including more, less or only a single element, are also contemplated as being within the scope of embodiments.

Further, each or any combination of procedures, processes, steps, or means explained in the above can be achieved as a software section or unit (e.g., subroutine) and/or a hardware section or unit (e.g., circuit or integrated circuit), including or not including a function of a related device; furthermore, the hardware section or unit can be constructed inside of a microcomputer.

Furthermore, the software section or unit or any combinations of multiple software sections or units can be included in a software program, which can be contained in a computer-readable storage media or can be installed in a computer via a communications network.

What is claimed is:

1. An in-vehicle apparatus having a handsfree function, comprising:
 a connection section that is connectable with a cellular phone by simultaneously using a handsfree communication protocol for handsfree communication and a mail forwarding protocol for mail forwarding, the cellular phone being operable in selectively one of a handset communication mode and a handsfree communication mode in a condition where the cellular phone is connected with the connection section by using the handsfree communication protocol,
  wherein, in the handset communication mode, a voice path between the cellular phone and the in-vehicle apparatus having the handsfree function is closed, and a voice inputted via a voice input part of the cellular phone is transmitted toward a communication counterpart as being an outgoing voice, and a voice received from the communication counterpart is outputted from a voice output part of the cellular phone as being an incoming voice,
wherein, in the handsfree communication mode, the voice path between the cellular phone and the in-vehicle apparatus having the handsfree function is open, and a voice inputted via a voice input device of the in-vehicle apparatus having the handsfree function is transmitted toward the communication counterpart as being the outgoing voice, and the voice received from the communication counterpart is outputted from a voice output device of the in-vehicle apparatus having the handsfree function as being the incoming voice;
a mail reception determination section that is configured to determine whether an incoming mail is received by the cellular phone, which is connected with the connection section by using the mail forwarding protocol;
a mode determination section that is configured to determine which one of the handset communication mode and the handsfree communication mode is selected in the cellular phone, which is connected with the connection section by using the mail forwarding protocol; and
a control section that is configured to control a mail reception notice regarding a notice that the incoming mail is received, such that:
the control section issues the mail reception notice to a user
when the mail reception determination section determines that the incoming mail is received by the cellular phone, which is connected with the connection section by using the mail forwarding protocol, and
when the mode determination section determines that the handset communication mode is selected in the cellular phone, by which the incoming mail is received; and
the control section prohibits the mail reception notice from being issued to the user
when the mail reception determination section determines that the incoming mail is received by the cellular phone, which is connected with the connection section by using the mail forwarding protocol, and
when the mode determination section determines that the handsfree communication mode is selected in the cellular phone, by which the incoming mail is received.

2. The in-vehicle apparatus having the handsfree function according to claim 1, wherein
the control section issues the mail reception notice to the user, when the mode determination section determines that the cellular phone is switched from the handsfree communication mode to the handset communication mode after:
the mail reception determination section determined that the incoming mail was received by the cellular phone, which is connected with the connection section by using the mail forwarding protocol; and
the mode determination section determined that the handsfree communication mode was selected in the cellular phone, by which the incoming mail was received.

3. The in-vehicle apparatus having the handsfree function according to claim 1, wherein:
the cellular phone is operable further in a standby mode where the cellular phone waits to receive an incoming call;
the mode determination section determines which one of the handset communication mode, the handsfree communication mode and the standby mode is selected in the cellular phone, which is connected with the connection section by using the mail forwarding protocol; and
the control section issues the mail reception notice to the user, when the mode determination section determines that the cellular phone is switched from the handsfree communication mode to the standby mode after:
the mail reception determination section determined that the incoming mail was received by the cellular phone, which is connected with the connection section by using the mail forwarding protocol; and
the mode determination section determined that the handsfree communication mode was selected in the cellular phone, by which the incoming mail was received.

4. The in-vehicle apparatus having the handsfree function according claim 1, wherein:
when the cellular phone, by which the incoming mail is received, is in the handset communication mode, volume of a mail reception notice sound outputted from the voice output device of the in-vehicle apparatus having the handsfree function is a first volume;
when the cellular phone, by which the incoming mail is received, is in the standby mode, the volume of the mail reception notice sound outputted from the voice output device of the in-vehicle apparatus having the handsfree function is a second volume; and
the control section sets the first volume so that the first volume is smaller than the second volume.

5. A cellular phone that is connectable with an in-vehicle apparatus having a handsfree function by simultaneously using a handsfree communication protocol for handsfree communication and a mail forwarding protocol for mail forwarding,
the cellular phone being operable in, when having a connection with the in-vehicle apparatus having the handsfree function by using the handsfree communication protocol, selectively one of
a handset communication mode where a voice path between the cellular phone and the in-vehicle apparatus having the handsfree function is closed, and a voice inputted via a voice input part of the cellular phone is transmitted toward a communication counterpart as being an outgoing voice, and a voice received from the communication counterpart is outputted from a voice output part of the cellular phone as being an incoming voice and
a handsfree communication mode where the voice path between the cellular phone and the in-vehicle apparatus having the handsfree function is open, and a voice inputted via a voice input device of the in-vehicle apparatus having the handsfree function is transmitted toward the communication counterpart as being the outgoing voice, and the voice received from the communication counterpart is outputted from a voice output device of the in-vehicle apparatus having the handsfree function as being the incoming voice,
the cellular phone being configured to issue a notification, which notifies that the cellular phone receives an incoming mail, to the in-vehicle apparatus having the handsfree function when the incoming mail is received by the cellular phone in a condition where: the cellular phone is connected with the in-vehicle apparatus having the handsfree function by simultaneously using the handsfree protocol and the mail forwarding protocol; and the handset communication mode is set in the cellular phone, the cellular phone being configured to prohibit the notification, which notifies that the cellular phone receives the incoming mail, from being issued to the in-vehicle apparatus having the handsfree function when the incoming mail is received by the cellular phone in a condition where the handsfree communication mode is set in the cellular phone.

6. A method of controlling a cellular phone, comprising:

causing the cellular phone to have a connection with an in-vehicle apparatus having a handsfree function by simultaneously using a handsfree communication protocol for handsfree communication, and a mail forwarding protocol for mail forwarding;

causing the cellular phone, when the cellular phone has the connection with the in-vehicle apparatus having the handsfree function by using the handsfree communication protocol, to be operable in selectively one of:
- a handset communication mode where a voice path between the cellular phone and the in-vehicle apparatus having the handsfree function is closed, and a voice inputted via a voice input part of the cellular phone is transmitted toward a communication counterpart as being an outgoing voice, and a voice received from the communication counterpart is outputted from a voice output part of the cellular phone as being an incoming voice; and
- a handsfree communication mode where the voice path between the cellular phone and the in-vehicle apparatus having the handsfree function is open, and a voice inputted via a voice input device of the in-vehicle apparatus having the handsfree function is transmitted toward the communication counterpart as being the outgoing voice, and the voice received from the communication counterpart is outputted from a voice output device of the in-vehicle apparatus having the handsfree function as being the incoming voice;

causing the cellular phone to issue a notification, which notifies that the cellular phone receives an incoming mail, to the in-vehicle apparatus having the handsfree function, when the cellular phone receives the incoming mail in a condition where:
- the cellular phone is connected with the in-vehicle apparatus having the handsfree function by simultaneously using the handsfree protocol and the mail forwarding protocol; and
- the cellular phone is in the handset communication mode; and prohibiting the cellular phone from issuing the notification, which notifies that the cellular phone receives the incoming mail, to the in-vehicle apparatus having the handsfree function, when the cellular phone receives the incoming mail in a condition where:
- the cellular phone is connected with the in-vehicle apparatus having the handsfree function by simultaneously using the handsfree protocol and the mail forwarding protocol; and
- the cellular phone is in the handsfree communication mode.

\* \* \* \* \*